United States Patent [19]
Sullivan

[11] Patent Number: 5,435,073
[45] Date of Patent: Jul. 25, 1995

[54] ALIGNMENT TOOL FOR ROTATING EQUIPMENT

[75] Inventor: David L. Sullivan, Bakersfield, Calif.

[73] Assignee: Texaco Inc., White Plains, N.Y.

[21] Appl. No.: 43,111

[22] Filed: Apr. 5, 1993

[51] Int. Cl.[6] .................. G01D 21/00; G01B 5/25
[52] U.S. Cl. ............................. 33/661; 33/412; 33/645
[58] Field of Search .............. 33/286, 412, 529, 645, 33/572, 533, 661

[56] References Cited

U.S. PATENT DOCUMENTS

| | | | |
|---|---|---|---|
| 2,516,854 | 8/1950 | Christian | 33/661 |
| 3,187,439 | 6/1965 | Bently | 33/661 |
| 4,033,042 | 7/1977 | Leach | 33/661 |
| 4,115,925 | 9/1978 | Malak | 33/661 |
| 4,120,095 | 10/1978 | Lebourg | 33/529 |
| 4,161,068 | 7/1979 | McMaster | 33/412 |
| 4,451,992 | 6/1984 | Malak | 33/412 |
| 4,516,328 | 5/1985 | Massey | 33/412 |
| 4,534,114 | 8/1985 | Woyton et al. | 33/412 |
| 4,553,335 | 11/1985 | Woyton | 33/645 |
| 5,056,237 | 10/1991 | Saunders | 33/412 |

Primary Examiner—Thomas B. Will
Attorney, Agent, or Firm—James L. Bailey; Kenneth R. Priem; William J. Beard

[57] ABSTRACT

A method and apparatus for aligning fixed and movable shafts includes members fastened to each shaft to extend substantially normal to the axis thereof and with indicators on the free ends thereof. Rigid members couple the free ends so that misalignment will be reflected in the indicators and necessary movement to align the shafts calculated from a simple formula.

3 Claims, 2 Drawing Sheets

ALIGNMENT TOOL FOR ROTATING EQUIPMENT

BACKGROUND OF THE INVENTION

1. The Field of the Invention

The present invention pertains to a method and apparatus for aligning shafts, such as the shaft of a motor and the shaft of a pump to be driven thereby, and in particular to their alignment with respect to the X, Y and Z axes.

2. The Prior Art

There are many problems associated with aligning two rotating shafts such as would be necessary, for example, to couple a motor to a compressor. The existing devices adequately align shafts in elevation and displacement (the X and Y coordinates when viewing the shaft from its end face). However, there is nothing presently available which will assure accurate alignment of the shafts along a common Z axis, without rotating both shafts a full 360° so that the shafts will be coaxially aligned and not out of parallel.

SUMMARY OF THE INVENTION

The present invention has first and second indicator assemblies each of which has a clamping assembly, a member attached by one end to the clamping assembly so as to extend normal to the respective shaft, and indicator means mounted on the free end of said member. Rigid means connect the indicator assemblies in such manner as to provide an angular indication of misalignment of the shafts from the torque developed as a result of the misalignment. A simple calculation from the readings shows the amount and direction of movement necessary to bring the shafts into alignment.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
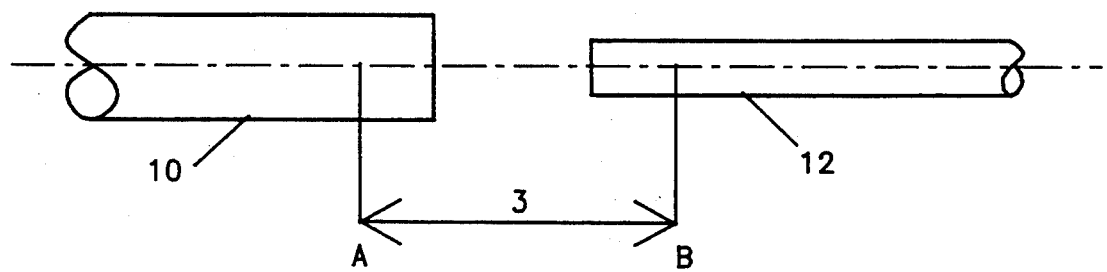
FIG. 1 is a diagrammatic top plan view of a pair of aligned shafts.
Figure 2:
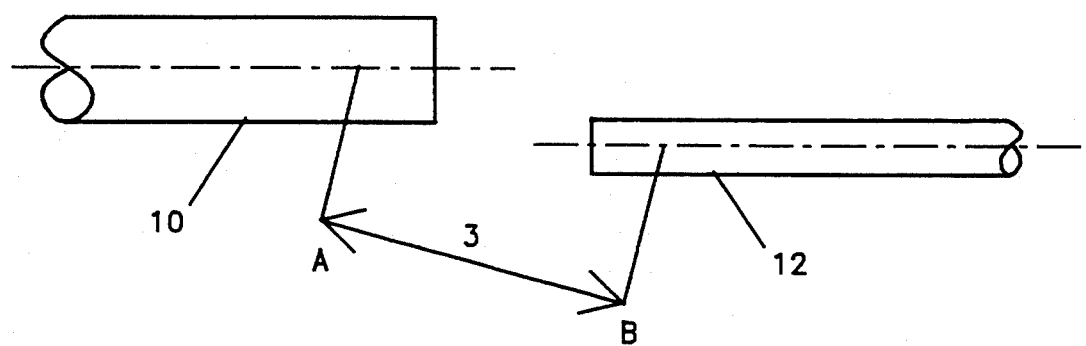
FIG. 2 is a similar diagrammatic top plan view of a pair of shafts misaligned in the X direction.
Figure 3:
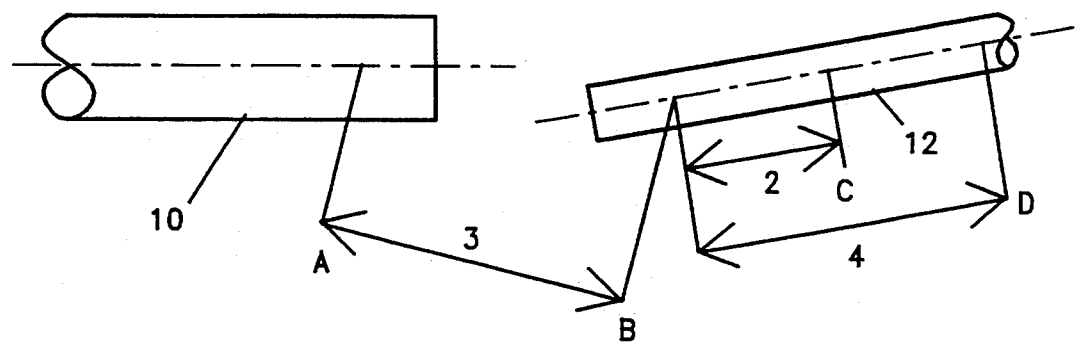
FIG. 3 is a similar diagrammatic top plan view of a pair of shafts misaligned along both the X and Z axes.
Figure 4:
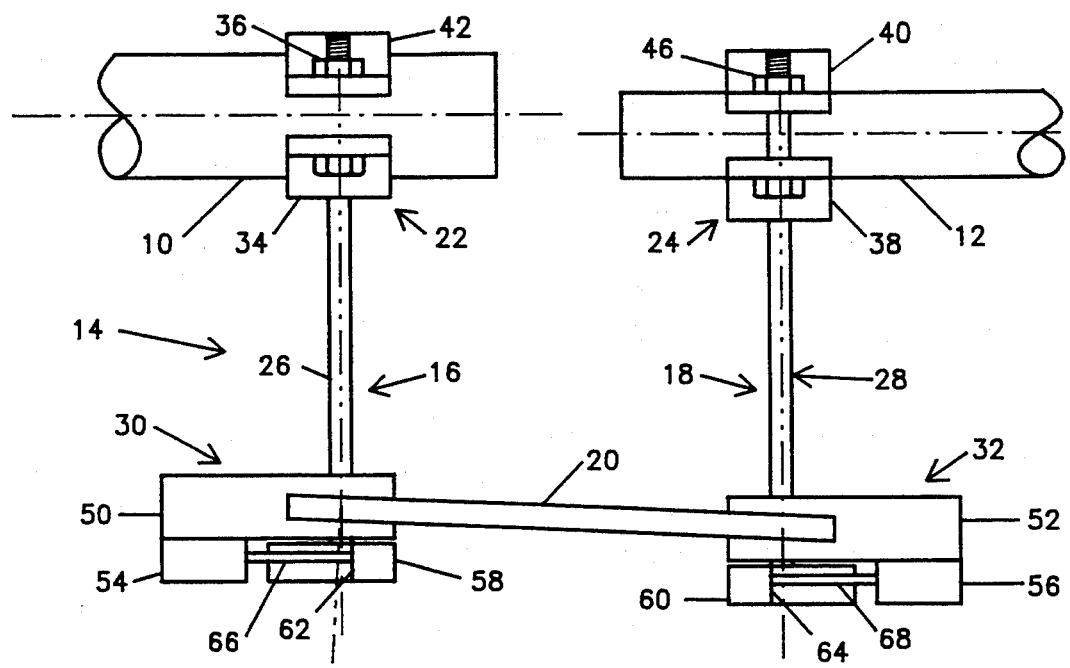
FIG. 4 is a top plan view of the present invention mounted on a pair of shafts to be aligned.
Figure 5:
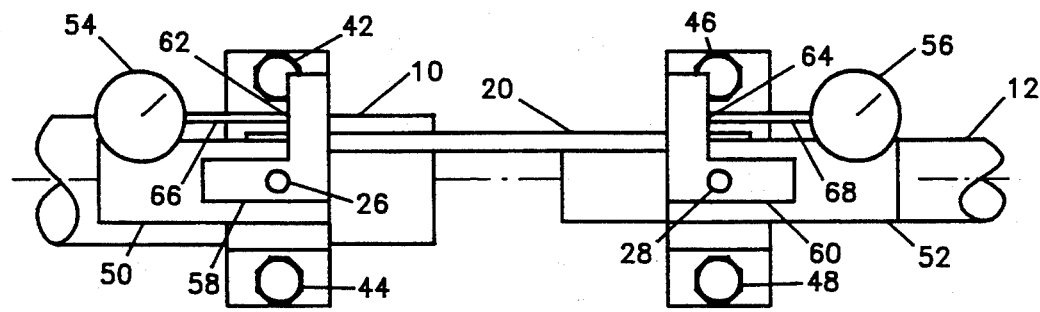
FIG. 5 is a front elevation of the present invention as shown in FIG. 4.
Figure 6:
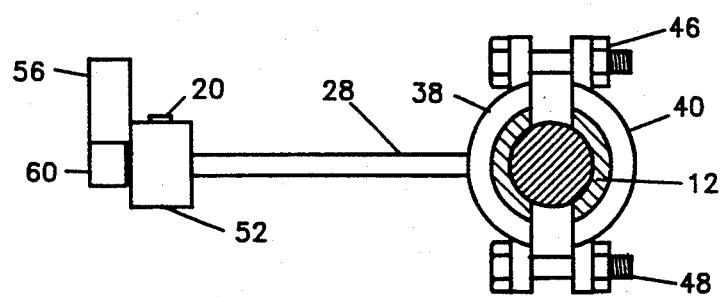
FIG. 6 is a end view of the present invention as shown in FIGS. 4 and 5.

The ideal alignment position of two shafts 10, 12 is shown in FIG. 1. Although this Figure is called out as a top plan view, it would be identical for front elevation, etc. While the two shafts, for example a fixed motor shaft 10 and a movable pump shaft 12, are shown having different diameters, their X and Y axes are aligned and their Z axes coaxial and parallel. A simple misalignment, with the shafts offset along the X axis, is shown in FIG. 2. A simple lateral movement of movable shaft 12 brings the two shafts into alignment. The more complicated misalignment, including both an offset of the shafts in the X direction and the axes of the shafts being relatively angularly offset so as to be out-of-parallel, is shown in FIG. 3. In order to correct this latter condition, the movable shaft must be rotated about itself as well as one end thereof moved laterally to bring the shafts into alignment.

The present invention 14 has first and second substantially identical indicator assemblies 16, 18 and a torsion bar 20 forming a generally U-shaped alignment measuring tool. Each indicator assembly 16, 18 has a clamping assembly 22, 24, a shaft member 26, 28, and indicator means 30, 32. The clamping assemblies 22, 24 can be of any known type and are here shown as comprising a pair of substantially identical clamping members 34, 36, 38, 40, detachable secured together by bolts 42, 44, 46 and 48. The shaft members 26, 28 are fixed to clamp members 34, 38 so as to extend normal to the axis of the respective fixed and movable shafts 10, 12, respectively, when the clamping members are mounted thereon. The only requirement for the clamping assemblies 22, 24 is that they be removably mounted on the respective fixed and movable shafts 10, 12 and that they hold the shaft members 26, 28 mounted thereon extending normal to the axis of the respective shafts 10, 12. Each indicator assembly 30, 32 includes a torsion mounting member 50, 52, known deflection gauge indicator means 54, 56 and sensing member 58 60. Each torsion member 50, 52 is mounted on the respective shaft 26, 28 by bearing means (not shown) which allow limited movement with respect to the shaft. The ends of the torsion bar 20 are received in aligned grooves of the mounting members 50, 52 and fixedly attached thereto. The sensing members 58, 60 are generally L-shaped members fixedly mounted on the ends of the respective shafts 26, 28 and provide abutment surfaces 62, 64 which are parallel to the axis of their respective shafts 26, 28. The gauge means 54, 56 are selected from any of the well known pressure responsive sensors having a sensing member 66, 68 engaging a respective abutment surface 62, 64 and known scale and pointer means indicating the displacement sensed thereby.

The subject tool 14 is operated in the following manner. First it is "calibrated" by mounting both indicator assemblies 16, 18 on a single shaft (not shown), preferably of similar diameter as that of the shafts to be aligned in the field. The indicator means are checked and adjusted, if necessary, to assure that both have identical readings. The tool 14 is then removed from this "standard" and placed on the shafts 10, 12, for example those of the previously discussed pump and motor, which shafts are to be aligned prior to coupling them together. The deflection gauge indicator means 54, 56 will show the drift or misalignment between the shafts as well as the direction and amount of correction which must be made to bring the shafts into alignment.

Returning to FIGS. 1–3 for an explanation of the operation of the subject invention, please note that shaft 10 has been considered as the fixed shaft and shaft 12 as the movable shaft. FIG. 2 shows a misalignment of approximately 1" of shaft 12 from the centered position (along the X axis) while both shafts are parallel (that is aligned along the Y and Z axes). This X axis off-set will be applied as torque to members 50, 52 by bar 20 and cause relative movement between the gauge means 54, 56 and their respective abutment surfaces 62, 64 and thus a reading "A" in this case 0.25", in the dials. In this case, in order to align the shafts 10 and 12, a movement of 0.75 is applied to the movable shaft 12 to bring both shafts into alignment according to the following formula:

$$\frac{0.25}{1} \times \frac{X}{3} = 3 * 0.25/1 = 0.75$$

In this instance the reading "B" on the indicator means 56 attached to the moveable shaft 12 is ignored.

Turning now to FIG. 3, the two shafts 10, 12 are not only shown misaligned, but they are also out of axial alignment or "out of parallel". The reading on the stationary shaft gauge means 54 again relates to how much too low the moveable shaft is, using the above formula. This is the movement necessary to lift the movable shaft be aligned from reading "A", in this case 0.99, and reading "B", in this case 0.235".

$$\frac{0.099}{1} \times \frac{X}{3} = 3 * 0.099/1 = .297$$

Now the "out of parallel" (Z axis) correction must be determined, again by a relatively simple formula. A simple ratio is used to establish how much movement need be applied to points C and D to place the movable shaft into alignment with the alignment too. Then to complete the equation, the value of the preceding calculation is added or subtracted to each solution.

$$\frac{-0.235}{1} \times \frac{x}{2} = 2 * -0.235/1 =$$

$$-.0470 + 0.297 = -.173 \text{ for } C$$

$$\frac{-0.235}{1} \times \frac{x}{4} = 4 * -0.235/1 =$$

$$-0.940 + 0.297 = -0.643 \text{ for } D$$

The present invention may be subject to many modifications and changes without departing from the spirit of essential characteristics thereof. The present embodiment should therefor be considered in all respects as illustrative and not restrictive of the scope of the present invention as defined by the appended claims.

I claim:

1. A tool for indicating the misalignment of the axes of rotation of a pair of rotatable shafts whose coaxial and coplanar alignment is desired and indicating direction of movement and data to calculate the amount of movement necessary to bring said shafts into alignment coaxially and in one plane, said tool comprising:
    first and second mounting means each adapted to be removably mounted on a respective one of said pair of shafts;
    first and second rigid members fixedly attached on one end thereof to each of said respective mounting means and extending normal to the axis of each respective shaft when said mounting means is mounted thereon thereby translating the position of each of said shaft axes to a direction normal thereto;
    first and second sensing members fixedly mounted to the opposite end of each of said rigid members;
    first and second torsion members mounted to allow limited movement rotationally about and translationally along each of said respective rigid members, said torsion members each being coupled to the other by a torsion bar fixedly attached at each end thereof to each of said torsion members and capable of flexure and elastic torsional rotation about its axis; and
    a pair of deflection gauge indicator means each fixedly mounted on one of said first and second torsion members and in mechanical coupling with its respective one of said first and second sensing members, whereby misalignment of said shaft axes is coupled via said rigid members and said sensing members to said deflection gauge indicator means via said torsion members and said torsion bar and readings of said gauge indicator means can be used to calculate the direction and distance of movement necessary to affect coaxial alignment of said shafts in one plane.

2. A tool according to claim 1 wherein said mounting means are adjustable to accommodate a wide range of shaft diameters.

3. A tool according to claim 1 wherein each said mounting means has a pair of substantially mirror image members and means securing said members together gripping a shaft therebetween.

* * * * *